(12) United States Patent
Kikuya et al.

(10) Patent No.: US 10,703,196 B2
(45) Date of Patent: Jul. 7, 2020

(54) REFUELING RETAINER

(71) Applicants: FUTABA INDUSTRIAL CO., LTD., Okazaki-shi, Aichi (JP); TOYOTA JIDOSHA KABUSHIKI KAISHA, Toyota-shi, Aichi (JP)

(72) Inventors: Kazunobu Kikuya, Okazaki (JP); Makoto Kato, Okazaki (JP); Masaharu Miki, Toyota (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 130 days.

(21) Appl. No.: 15/315,013

(22) PCT Filed: Mar. 30, 2015

(86) PCT No.: PCT/JP2015/059985
§ 371 (c)(1),
(2) Date: Nov. 30, 2016

(87) PCT Pub. No.: WO2015/182237
PCT Pub. Date: Dec. 3, 2015

(65) Prior Publication Data
US 2017/0190248 A1    Jul. 6, 2017

(30) Foreign Application Priority Data
May 30, 2014    (JP) .................. 2014-113014

(51) Int. Cl.
*B60K 15/04*    (2006.01)
(52) U.S. Cl.
CPC ........ *B60K 15/04* (2013.01); *B60K 2015/049* (2013.01); *B60K 2015/0458* (2013.01);
(Continued)

(58) Field of Classification Search
CPC .............. B60K 15/04; B60K 2015/049; B60K 2015/048; B60K 2015/0458;
(Continued)

(56) References Cited

U.S. PATENT DOCUMENTS 5,860,460 A    1/1999    Hidano et al.
6,405,767 B1 *  6/2002    Marsala ................. B60K 15/04
                                                  141/286
(Continued)

FOREIGN PATENT DOCUMENTS

EP    1199208 A1    4/2002
JP    S57-178932 A   11/1982
(Continued)

OTHER PUBLICATIONS

Notification of Transmittal of Translation of the International Preliminary Report on Patentability (Form PCT/IB/338) and Translation of the International Preliminary Report on Patentability (Form PCT/IPEA/409) for International Application No. PCT/JP2015/059985, dated Dec. 1, 2016 (6 pages total).

(Continued)

*Primary Examiner* — Andrew D Perreault
(74) *Attorney, Agent, or Firm* — Withrow & Terranova, P.L.L.C.; Vincent K. Gustafson

(57) ABSTRACT

A refueling retainer comprises a body portion of a tubular shape inserted into and arranged at a fueling-side end portion of an inlet pipe through which fuel is introduced to a fuel tank. The body portion comprises at a leading end portion thereof: a tapered portion, which is an inner peripheral surface of the leading end portion inclined radially inward toward a leading end of the body portion; and a claw portion that projects from the leading end of the body portion in an inwardly bent manner.

3 Claims, 5 Drawing Sheets

(52) U.S. Cl.
CPC ............... *B60K 2015/0477* (2013.01); *B60K 2015/0487* (2013.01)

(58) Field of Classification Search
CPC .... B60K 2015/0477; B60K 2015/0487; B60K 2015/0483
USPC .......................................... 220/86.2; 141/392
See application file for complete search history.

(56) References Cited

U.S. PATENT DOCUMENTS

| | | | | |
|---|---|---|---|---|
| 9,649,930 | B2* | 5/2017 | Kato ..................... | B60K 15/04 |
| 2006/0096662 | A1* | 5/2006 | King ..................... | B60K 15/04 141/367 |
| 2009/0014091 | A1 | 1/2009 | Kobayashi et al. | |
| 2011/0214783 | A1* | 9/2011 | Ichimaru ................ | B60K 15/04 141/381 |

FOREIGN PATENT DOCUMENTS

| | | |
|---|---|---|
| JP | S58-86726 U | 6/1983 |
| JP | S60-192929 U | 12/1985 |
| JP | H08-238944 A | 9/1996 |
| JP | 2009-208517 A | 9/2009 |
| JP | 2010-195355 A | 9/2010 |
| JP | 5005450 B | 8/2012 |
| JP | 5200586 B2 | 6/2013 |
| JP | 2014-189267 A | 10/2014 |

OTHER PUBLICATIONS

Written Opinion (Form PCT/ISA/237) dated Dec. 3, 2015 and Partial English Translation (of Box No. V, Item 2. Citations and explanations) of Form PCT/ISA/237 for International Application No. PCT/JP2015/059985 (7 pages including Partial English Translation).

International Search Report (Form PCT/ISA/210) for International Application No. PCT/JP2015/059985 dated Jun. 16, 2015 (4 pages including English translation).

Written Opinion of the International Search Authority (Form PCT/IPEA/409) for International Application No. PCT/JP2015/059985 dated Jun. 17, 2016 (4 pages).

Notification of Reasons of Refusal for Japanese Patent Application No. 2014-113014 dated Jan. 9, 2018 (7 pages including English language translation).

* cited by examiner

REFUELING RETAINER

CROSS-REFERENCE TO RELATED APPLICATIONS

This application is a 35 U.S.C. § 371 national phase filing of International Application No. PCT/JP2015/059985 filed on Mar. 30, 2015, and claims the benefit of Japanese Patent Application No. 2014-113014 filed on May 30, 2014 with the Japan Patent Office. The entire disclosures of International Application No. PCT/JP2015/059985 and Japanese Patent Application No. 2014-113014 are hereby incorporated by reference herein in their respective entireties.

TECHNICAL FIELD

The present invention relates to a refueling retainer.

BACKGROUND ART

Fuel inlets for pouring fuel such as gasoline into a fuel tank of a vehicle or the like are conventionally known. Generally, such a fuel inlet (filler pipe) comprises an inlet pipe through which the fuel is introduced from a fuel filler opening to the fuel tank. At a fueling-side end portion of the inlet pipe, a refueling retainer is arranged as a separate body from the inlet pipe.

For example, Patent Document 1 discloses a fuel filler opening structure in which a tubular refueling retainer (a nozzle guide) is provided that guides insertion of a nozzle of a refueling gun. Such a fuel filler opening structure is configured to restrict insertion of the nozzle of the refueling gun by a pair of inward protrusions provided in a recessed manner on the refueling retainer.

PRIOR ART DOCUMENTS

Patent Documents

Patent Document 1: Japanese Patent No. 5200586

SUMMARY OF THE INVENTION

Problems to be Solved by the Invention

However, the above-described fuel filler opening structure in Patent Document 1 has following problems. Specifically, the refueling guns have a variety of types. The refueling guns generally have an approximately boomerang-like shape, but each refueling gun has a different curved position. Moreover, some refueling guns have a relatively long nozzle, and other refueling guns have a relatively short nozzle. Furthermore, in some refueling guns, a sensor for stopping fueling is attached to a different position. Thus, variation in the types of the refueling guns causes variation in the orientation (angle) of the nozzle of the refueling gun at the time of insertion into the fuel filler opening, the insertion position (the leading end position) of the nozzle of the refueling gun, the position of the sensor attached to the refueling gun, and so on. As a result, fueling operation cannot be performed in a stable manner.

In one aspect of the present invention, it is desirable to provide a refueling retainer that enables, despite its simple structure, stable fueling operation by restricting an insertion position, a direction, and so on of a nozzle regardless of a type of a refueling gun.

Means for Solving the Problems

A refueling retainer according to one aspect of the present invention comprises a body portion of a tubular shape inserted into and arranged at a fueling-side end portion of an inlet pipe through which fuel is introduced to a fuel tank. The body portion comprises at a leading end portion thereof: a tapered portion, which is an inner peripheral surface of the leading end portion inclined radially inward toward a leading end of the body portion; and a claw portion that projects from the leading end of the body portion in an inwardly bent manner.

In the refueling retainer, the body portion of the tubular shape comprises, at the leading end portion thereof, the tapered portion, which is the inner peripheral surface of the leading end portion inclined radially inward toward the leading end of the body portion. Thus, when a refueling gun is inserted into the refueling retainer, a leading end portion (the nozzle) of the refueling gun is guided by the tapered portion, and the nozzle of the refueling gun can be directed to a fixed direction. This enables stable fueling by the refueling gun.

Further, the body portion comprises, at the leading end portion thereof, the claw portion that projects from the leading end of the body portion in an inwardly bent manner. Thus, a leading end position of the refueling gun can be restricted easily by the claw portion regardless of a length of the nozzle of the refueling gun, i.e., both in the case of the refueling gun with the nozzle having relatively long length and in the case of the refueling gun with the nozzle having relatively short length. This inhibits the refueling gun from being inserted excessively, and enables stable fueling by the refueling gun. Moreover, in a case where a sensor for stopping fueling is attached to the refueling gun, a position of the sensor is fixed, to thereby enable stable fueling by the refueling gun. Furthermore, the claw portion can be formed by bending the leading end portion of the body portion, and thus, the claw portion can be easily shaped by press molding or the like and accuracy of the shape of the claw portion can be increased.

As described above, according to one aspect of the present invention, the refueling retainer can be provided that enables, despite its simple structure, stable fueling operation by restricting an insertion position, a direction, and so on of the nozzle regardless of a type of the refueling gun.

In the refueling retainer, the body portion may comprise an elliptical portion provided to at least part thereof. A section of the elliptical portion perpendicular to an axial direction thereof has an elliptical shape. In this case, restriction by a diameter of the refueling gun is enabled in the elliptical portion. For example, insertion of a large-diameter refueling gun or the like for leaded gasoline can be restricted in the elliptical portion.

Further, the body portion may comprise a sensor cutout portion formed at the leading end portion thereof. The sensor cutout portion is for exposure of an auto-stop sensor of the refueling gun inserted into the body portion. In this case, the auto-stop sensor of the refueling gun can be exposed at the sensor cutout portion. This enables the auto-stop sensor of the refueling gun to react reliably at completion of fueling, to thereby inhibit blow-back of fuel during fueling.

In the refueling retainer, "the leading end portion" of the body portion refers to a (fuel-tank-side) end portion positioned opposite to a fueling side of the body portion. Further, the tapered portion may be provided throughout the entire circumferential periphery at the inner peripheral surface of the leading end portion of the body portion, or may be provided to part of the inner peripheral surface.

EXPLANATION OF REFERENCE NUMERALS

Figure 1:
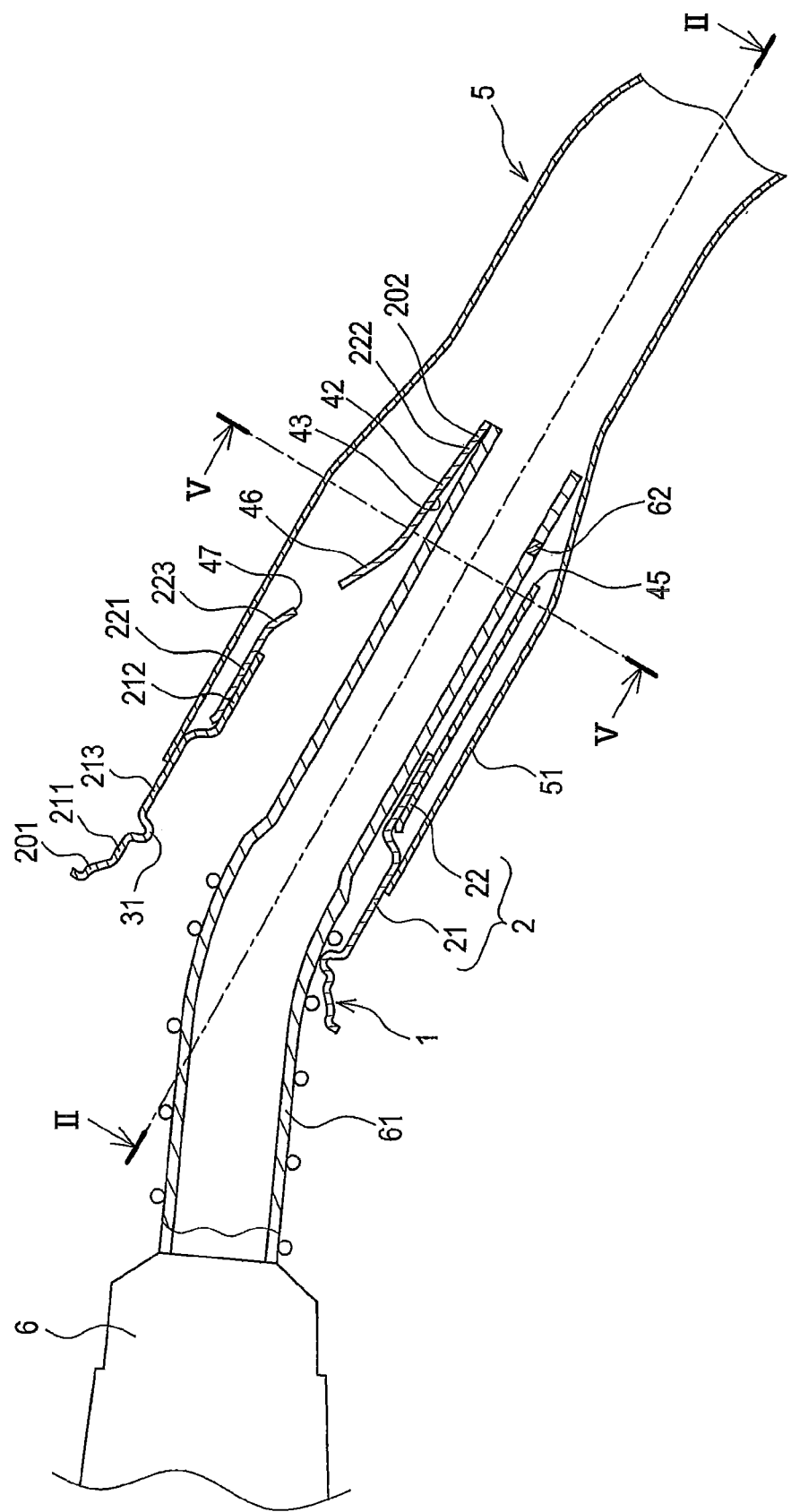
FIG. 1 is an explanatory diagram showing a structure of a fuel inlet including a refueling retainer of Embodiment 1.

1 . . . refueling retainer, 2 . . . body portion, 202 . . . leading end portion, 43 . . . tapered portion, 44 . . . claw portion, 5 . . . inlet pipe.

MODE FOR CARRYING OUT THE INVENTION

Embodiments of the present invention will be described below with reference to the drawings.

Embodiment 1

As shown in FIG. 1 to FIG. 5, a refueling retainer 1 of the present embodiment comprises a body portion 2 of a tubular shape inserted into and arranged at a fueling-side end portion of an inlet pipe 5 through which fuel is introduced to a fuel tank. Provided to a leading end portion 202 of the body portion 2 are a tapered portion 43, which is an inner peripheral surface of the leading end portion 202 inclined radially inward toward a leading end of the body portion 2, and claw portions 44 projecting from the leading end of the body portion 2 in an inwardly bent manner. A detailed explanation will be given below about the refueling retainer 1.

Figure 2:
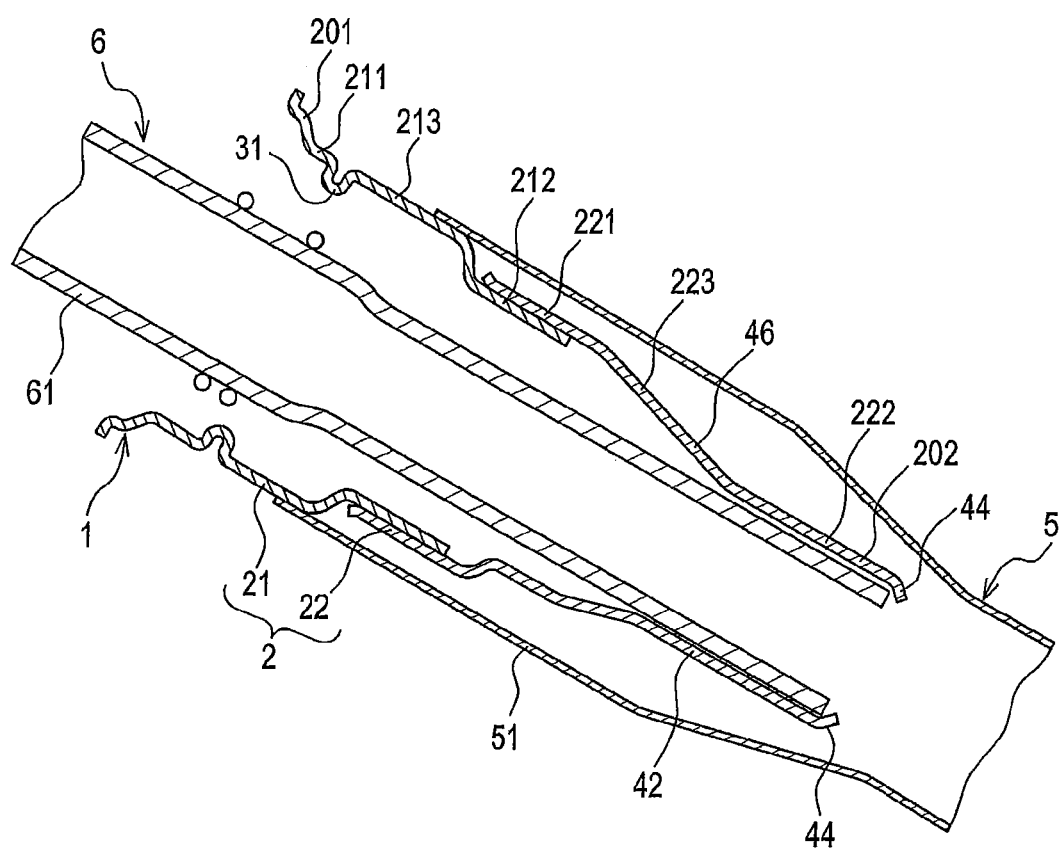
FIG. 2 is a sectional view taken along a line II-II in FIG. 1.

As shown in FIG. 1 and FIG. 2, the refueling retainer 1 of the present embodiment constitutes a part of a fuel inlet. The fuel inlet is an automotive component used for pouring fuel into the fuel tank. The fuel inlet comprises the refueling retainer 1, the inlet pipe 5, a breather tube (not shown), and so on.

The inlet pipe 5 is a cylindrical pipe. The inlet pipe 5 forms a fuel supply path for introducing fuel (gasoline, etc.) from a fuel filler opening to the fuel tank. The inlet pipe 5 of the present embodiment is made of metal. Provided at the fueling-side end portion of the inlet pipe 5, i.e., an end portion on an upstream side of the fuel supply path (upstream end portion), is an inlet portion 51 having an enlarged diameter. An air filter (not shown) is provided on an outer periphery of an upstream end of the inlet portion 51.

The breather tube is a cylindrical pipe. The breather tube forms an air vent path for guiding so-called vapor, i.e., air containing fuel vapor within the fuel tank, toward an upstream side of the inlet pipe 5 to thereby relieve internal pressure of the fuel tank. The breather tube of the present embodiment is made of metal. The breather tube is connected to the inlet pipe 5 in a state in which a leading end of the breather tube penetrates the inlet pipe 5. The breather tube is fixed to the inlet pipe 5 by brazing, for example.

Figure 3:
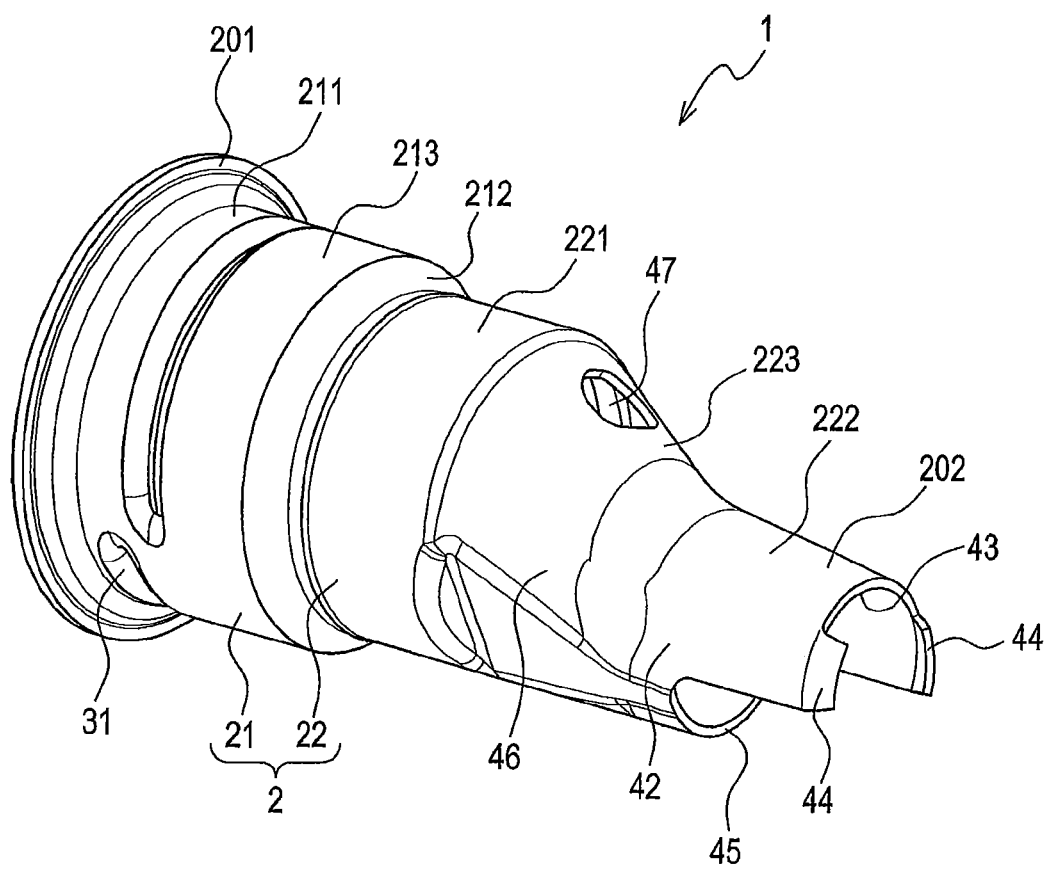
FIG. 3 is a perspective view showing the refueling retainer of Embodiment 1.

As shown in FIG. 1 to FIG. 3, the refueling retainer 1, which is a separate component from the inlet pipe 5, is provided in the inlet portion 51 of the inlet pipe 5. The refueling retainer 1 is a tubular component into which a nozzle 61 of a refueling gun 6 is inserted. The refueling retainer 1 of the present embodiment is made of metal. The refueling retainer 1 comprises the body portion 2 of a tubular shape inserted into and arranged at the inlet portion 51 of the inlet pipe 5.

The body portion 2 is fixed to the inlet portion 51 by welding or the like in a state in which part of the body portion 2 is inserted into the inlet portion 51 of the inlet pipe 5. The body portion 2 is configured with two separate components, i.e., a first component 21 and a second component 22. The first component 21 constitutes a base-end-side part including a base end portion 201 of the body portion 2. The second component 22 constitutes a leading-end-side part including the leading end portion 202 of the body portion 2.

The first component 21 is a tubular component having openings provided at both end portions 211 and 212. The first component 21 is formed by drawing. Since the first component 21 is a component constituting a fuel filler opening portion required to have a specified strength, the first component 21 is formed of a material (for example, a stainless-steel plate material having a plate thickness of 1.2 mm) having a greater plate thickness than the inlet pipe 5 and so on.

The first component 21 has different outer diameters at different axial positions of the first component 21. A central axis of the first component 21 is invariable (coaxial) independent of the axial position of the first component 21. Specifically, the first component 21 has a portion formed at an end portion on an upstream side of the fuel supply path (the upstream end portion 211). An outer diameter of the upstream end portion 211 is larger than an inner diameter of the inlet portion 51. The upstream end portion 211 is arranged so as to be exposed at an outer side of the inlet portion 51, and forms the fuel filler opening for insertion of the nozzle 61 of the refueling gun 6. The upstream end portion 211 has a threaded portion (a spiral engagement portion) 31 formed on an inner peripheral surface thereof, which is an attaching and detaching mechanism for attaching and detaching a fuel filler cap (not shown). The threaded portion 31 performs a function of latching (catching) the refueling gun 6 (the nozzle 61) at the time of insertion of the refueling gun 6.

On the other hand, in the first component 21, an end portion on a downstream side of the fuel supply path (the downstream end portion 212) is shaped cylindrically such that an outer diameter of the downstream end portion 212 is smaller than the inner diameter of the inlet portion 51. An end face of the downstream end portion 212 is shaped planarly throughout its entire periphery (in a form in which it has been cut along a plane perpendicular to its axial direction).

Further, in the first component 21, a central portion 213 positioned between the upstream end portion 211 and the downstream end portion 212 is shaped cylindrically such that an outer diameter of the central portion 213 is sized to correspond to the inner diameter of the inlet portion 51 (for example, sized to be the same as or slightly smaller than the inner diameter of the inlet portion 51). The central portion 213 is in an inserted state into the inlet portion 51. The central portion 213 is fixed to the inlet portion 51 by welding or the like in such a manner as to leave no gap throughout an entire periphery of the upstream end portion of the inlet portion 51.

The second component 22 is a tubular component having openings provided at both axial ends thereof. The second component 22 is composed of a rolled pipe. The second component 22 is formed by rolling up a stainless-steel plate material, butting one edge and the other edge of the plate material against each other, and welding such a butted portion 41 to join the edges. In the present embodiment, the second component 22 is formed of a material having the same plate thickness and properties as the first component 21.

In the second component 22, the end portion on the upstream side of the fuel supply path (the upstream end portion 221) is shaped cylindrically such that an inner diameter of the upstream end portion 221 is sized to correspond to the outer diameter of the downstream end portion 212 of the first component 21 (for example, sized to be the same as or slightly larger than the outer diameter of the downstream end portion 212).

On the other hand, the second component 22 has an elliptical portion 42 formed at an end portion on the downstream side of the fuel supply path (a downstream end portion 222). A section of the elliptical portion 42 perpendicular to its axial direction has an elliptical shape. The elliptical portion 42 constitutes the leading end portion 202 of the body portion 2.

Figure 5:
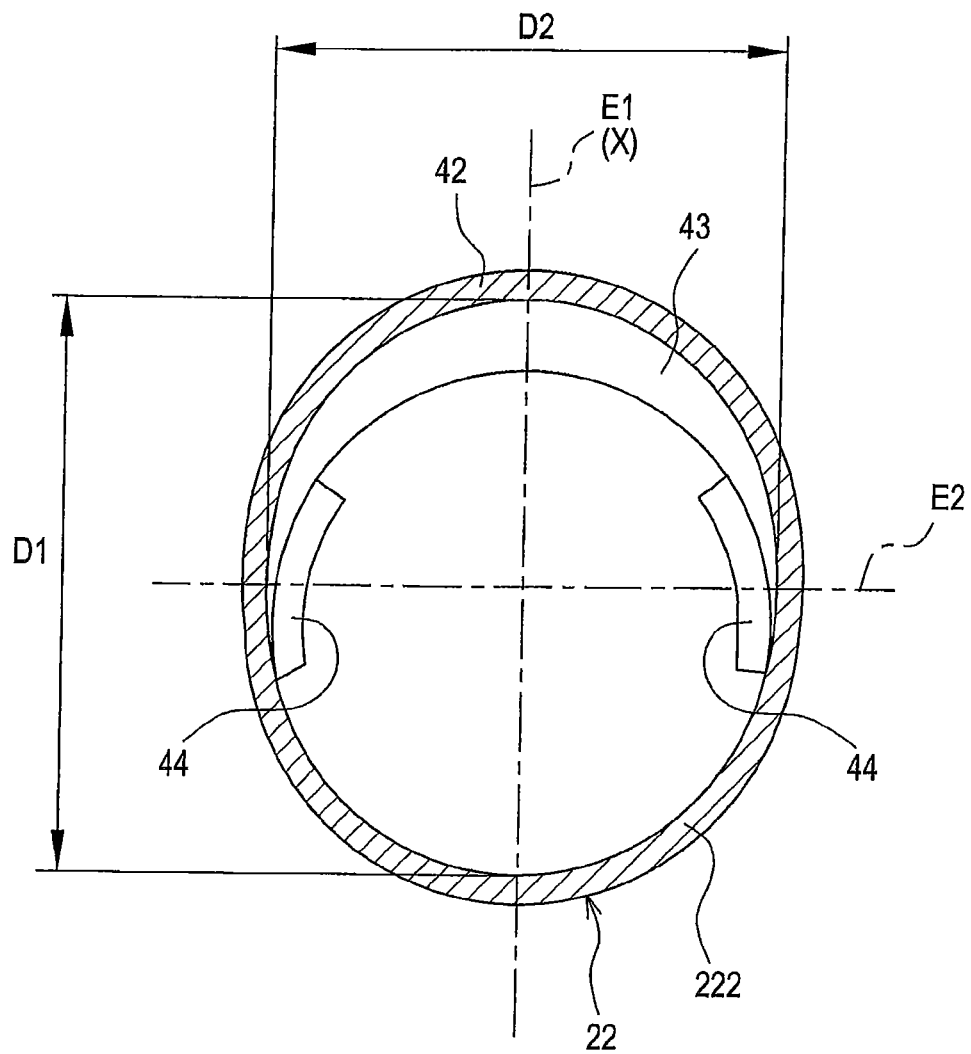
FIG. 5 is a sectional view taken along a line V-V in FIG. 1.

As shown in FIG. 5, in the section perpendicular to an axial direction of the second component 22, a shape of an inner peripheral surface (an inner peripheral shape) of the elliptical portion 42 is elliptical. When a major axis of the ellipse formed by an inner peripheral surface of the elliptical portion 42 is referred to as D1 and a minor axis is referred to as D2, a relationship of "the major axis D1>the minor axis D2" is satisfied. The minor axis D2 is sized to be slightly larger than an outer diameter of the nozzle 61 of the refueling gun 6 (to an extent allowing some room). The minor axis D2 is sized to be smaller than an outer diameter of a nozzle of a refueling gun for leaded gasoline.

An angle of inclination a (not shown) of a major axis direction E1 of the elliptical portion 42 with respect to a vehicle vertical direction X is set to be 75° or less. In the present embodiment, the angle of inclination a is 0°. That is, the major axis direction E1 of the elliptical portion 42 is the same direction as the vehicle vertical direction X. A minor axis direction E2 of the elliptical portion 42 is a direction perpendicular to the vehicle vertical direction X.

Figure 4:
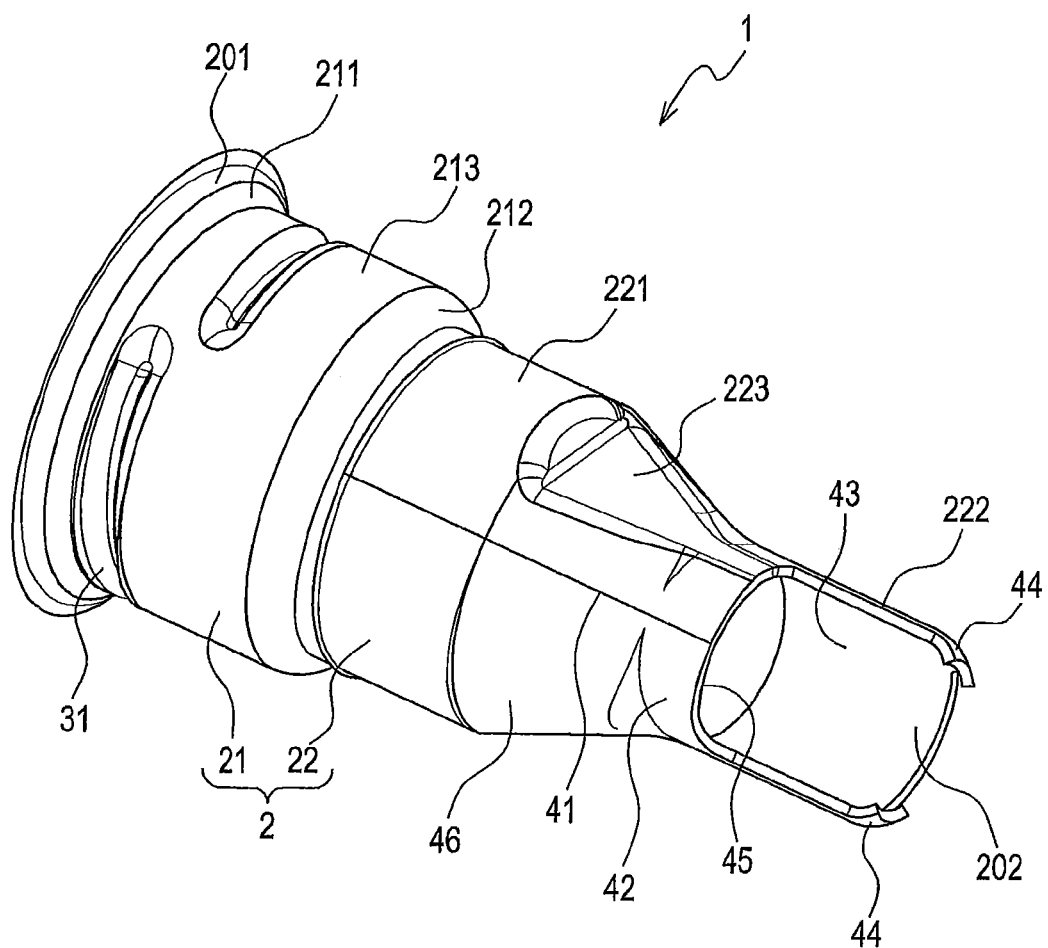
FIG. 4 is a perspective view showing a side of a sensor cutout portion of the refueling retainer of Embodiment 1.

As shown in FIG. 3 to FIG. 5, the downstream end portion 222 of the second component 22 (the leading end portion 202 of the body portion 2) has the tapered portion 43 provided thereto, which is an inner peripheral surface of the downstream end portion 222 inclined radially inward toward a downstream end of the second component 22 (the leading end of the body portion 2). The tapered portion 43 performs a function of enhancing efficiency in fueling by guiding the nozzle 61 of the refueling gun 6 and directing a leading end of the nozzle 61 to an opening of the downstream end portion 222 of the second component 22 (an opening of the leading end portion 202 of the body portion 2). The tapered portion 43 is not provided throughout an entire circumferential periphery of the downstream end portion 222 of the second component 22 but provided on part of the circumferential periphery. The tapered portion 43 may be provided throughout the entire circumferential periphery of the downstream end portion 222 of the second component 22.

Provided to the downstream end portion 222 of the second component 22 (the leading end portion 202 of the body portion 2) is a pair of the claw portions 44 projecting from a leading end of the elliptical portion 42 in an inwardly bent manner. The pair of claw portions 44 are provided opposite to each other in the minor axis direction E2 of the elliptical portion 42. The claw portions 44 are formed by bending a leading end portion of the body portion 2 by press forming.

As shown in FIG. 3 and FIG. 4, the downstream end portion 222 of the second component 22 (the leading end portion 202 of the body portion 2) has a sensor cutout portion 45 provided thereto that is cut out from the downstream end of the second component 22 (the leading end of the body portion 2) to expose an auto-stop sensor 62 arranged on the nozzle 61 of the refueling gun 6. The auto-stop sensor 62 stops supply of fuel from the nozzle 61 of the refueling gun 6 when the fuel exceeds a specified amount.

In the second component 22, a central portion 223 positioned between the upstream end portion 221 and the downstream end portion 222 is cylindrically shaped such that an inner diameter of the central portion 223 is smaller than the inner diameter of the upstream end portion 221 and larger than an inner diameter of the downstream end portion 222. Provided to the central portion 223 is a reduced diameter portion 46 in which its diameters (inner diameter and outer diameter) are reduced from the upstream end portion 221 toward the downstream end portion 222. The reduced diameter portion 46 performs a function of guiding the nozzle 61 of the refueling gun 6 inserted into the body portion 2 of the refueling retainer 1.

As shown in FIG. 3, the central portion 223 of the second component 22 has a plurality of air vent holes 47 for causing the vapor supplied from the breather tube to the upstream side of the inlet pipe 5 to pass through and to be discharged outside. In the inlet pipe 5, the vapor from the breather tube is supplied to downstream of the refueling retainer 1 in the fuel supply path. Thus, in order that the vapor may be discharged outside, the vapor has to pass through (go through) the refueling retainer 1. The air vent hole 47 forms a vapor passing path at the time when the vapor passes through the refueling retainer 1.

As shown in FIG. 1 and FIG. 2, the second component 22 is fixed to the first component 21. The second component 22 constitutes the body portion 2 together with the first component 21. Specifically, the upstream end portion 221 of the second component 22 is attached to the downstream end portion 212 of the first component 21 in such a manner as to externally cover the downstream end portion 212 of the first component 21. The upstream end portion 221 of the second component 22 is fixed to the downstream end portion 212 of the first component 21 by welding or the like (for example, by spot welding). Due to such a structure, when the nozzle 61 of the refueling gun 6 is inserted into the body portion 2 of the refueling retainer 1, the nozzle 61 is inhibited from getting caught at a position where the first component 21 and the second component 22 are fixed to each other, to thereby enable smooth insertion of the nozzle 61.

Next, an explanation will be given about effects of the refueling retainer 1 of the present embodiment.

In the refueling retainer 1 of the present embodiment, the tapered portion 43, which is the inner peripheral surface of the leading end portion 202 inclined radially inward toward the leading end of the body portion 2, is provided at the leading end portion 202 of the body portion 2 of a tubular shape. Thus, when the refueling gun 6 is inserted into the refueling retainer 1, a leading end portion of the refueling gun 6 (the nozzle 61) is guided by the tapered portion 43, and the nozzle 61 of the refueling gun 6 can be directed to a fixed direction. This enables stable fueling by the refueling gun 6.

In the leading end portion 202 of the body portion 2, the claw portions 44 are provided that project from the leading end of the body portion 2 in an inwardly bent manner. Thus, a leading end position of the nozzle 61 can be restricted easily by the claw portions 44 regardless of a length of the nozzle 61 of the refueling gun 6, i.e., both in the case of the refueling gun 6 with the nozzle 61 having relatively long length and in the case of the refueling gun 6 with the nozzle 61 having relatively short length. This inhibits the refueling gun 6 from being inserted excessively, and enables stable fueling by the refueling gun 6. Moreover, in a case where a sensor for stopping fueling (the auto-stop sensor 62) is attached, a position of the sensor (the auto-stop sensor 62) is fixed, to thereby enable stable fueling by the refueling gun 6. Furthermore, the claw portions 44 can be formed by bending the leading end portion of the body portion 2, and thus, the claw portions 44 can be easily shaped by press molding or the like and accuracy of the shapes of the claw portions 44 can be increased.

In the refueling retainer 1 of the present embodiment, the elliptical portion 42, whose section perpendicular to its axial direction has an elliptical shape, is provided to the body portion 2. Thus, restriction by a diameter of the refueling gun 6 is enabled in the elliptical portion 42. For example, insertion of a large-diameter refueling gun or the like for leaded gasoline can be restricted in the elliptical portion 42.

In the leading end portion 202 of the body portion 2, the sensor cutout portion 45 is provided for exposure of the auto-stop sensor 62 of the refueling gun 6 inserted into to the body portion 2. Thus, the auto-stop sensor 62 of the refueling gun 6 can be exposed at the sensor cutout portion 45. This enables the auto-stop sensor 62 of the refueling gun 6 to react reliably at completion of fueling, to thereby inhibit blow-back of fuel during fueling.

As described above, according to the present embodiment, the refueling retainer 1 can be provided that enables, despite its simple structure, stable fueling operation by restricting an insertion position, a direction, and so on of the nozzle 61 regardless of a type of the refueling gun 6.

Other Embodiments

It is needless to say that the present invention is not limited to the above-described embodiment and can be implemented in various forms within a range not departing from the present invention.

(1) In the above-described embodiment, the claw portions 44 are provided, as a pair, opposite to each other in the minor axis direction E2 of the elliptical portion 42, as shown in FIG. 5 and so on. However, the configuration is not limited to this and, for example, a claw portion may be provided in another position. In such a case, it is preferred that the claw portion be provided in a position not blocking flow of fuel supplied from a refueling gun.

(2) In the above-described embodiment, the elliptical portion 42 is provided to the leading end portion 202 of the body portion 2, as shown in FIG. 5 and so on. However, the configuration is not limited to this and, for example, the elliptical portion 42 may be provided to a portion other than the leading end portion 202 of the body portion 2.

(3) In the above-described embodiment, the body portion 2 is configured with two components, i.e., the first component 21 and the second component 22, as shown in FIG. 1 and so on. However, the configuration is not limited to this and, for example, a body portion may be configured with one component or may be configured with three or more components.

(4) The respective elements of the present invention are conceptual ones and not limited to the above-described embodiment. For example, functions of one element may be divided and performed by a plurality of elements, and functions of a plurality of elements may be integrated and performed by one element. Further, at least part of the configuration in the above-described embodiment may be substituted by a known configuration having similar functions.

The invention claimed is:

1. A refueling retainer comprising:
a body portion of a tubular shape configured for insertion into an inlet pipe of a fuel tank through which fuel may be introduced, wherein the body portion is arranged at a fueling-side end portion of the inlet pipe,
wherein the body portion comprises a first component positioned on an upstream side and a second component positioned on a downstream side, and
wherein the second component comprises:
an upstream end portion that comprises a cylindrical cross-sectional shape and that is sized to mate with the first component;
a central portion that comprises a reduced diameter portion and an air vent hole;
a downstream end portion that includes:
an elliptical portion having an elliptical shape that is non-circular, wherein the elliptical shape has a major axis with a dimension D1 and a minor axis with a dimension D2, wherein D2 is sized to receive an outer diameter of a nozzle of a refueling gun for unleaded gasoline, and wherein D2 is sized to reject an outer diameter of a nozzle of a refueling gun for leaded gasoline,
a tapered portion extending downstream from the elliptical portion,
a sensor cutout portion extending downstream from the elliptical portion and located below the tapered portion, and
a claw portion extending downstream and radially inwardly from the tapered portion;
wherein the claw portion includes first and second claws that bend inwardly toward each other and that extend from a downstream edge of the tapered portion, and
wherein the sensor cutout portion extends from a lower edge of the first claw to a lower edge of the second claw.

2. The refueling retainer according to claim 1, wherein an inner circumference of the elliptical portion is configured such that the dimension D2 of the minor axis is sized to be smaller than the outer diameter of the nozzle of a refueling gun for leaded gasoline.

3. The refueling retainer of claim 1, wherein the first component and the second component are fixed together by a welded interface.

* * * * *